Nov. 14, 1939.    D. B. BAKER ET AL    2,179,875
TRACK ROLLER
Filed July 3, 1937
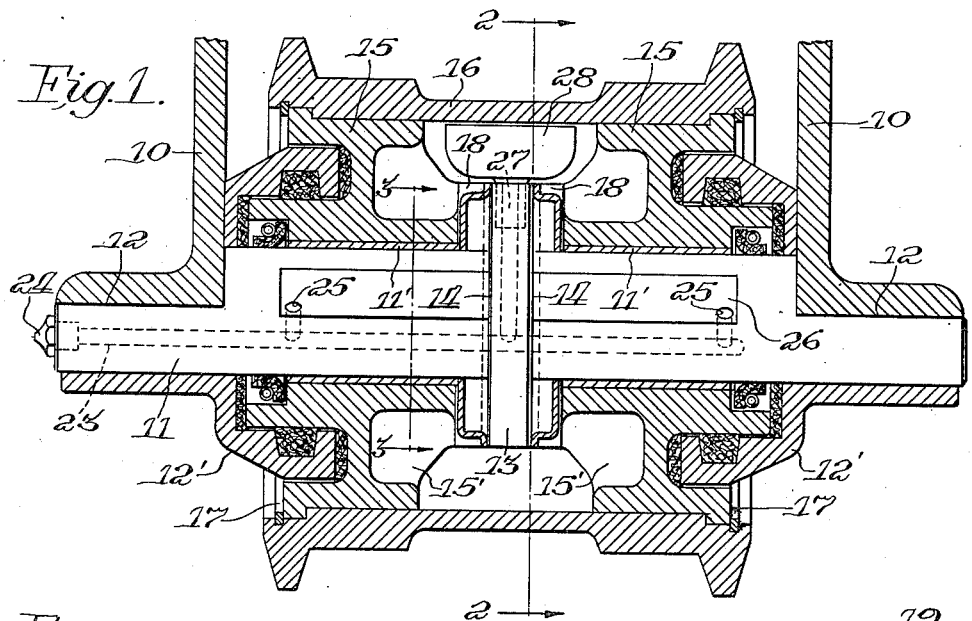
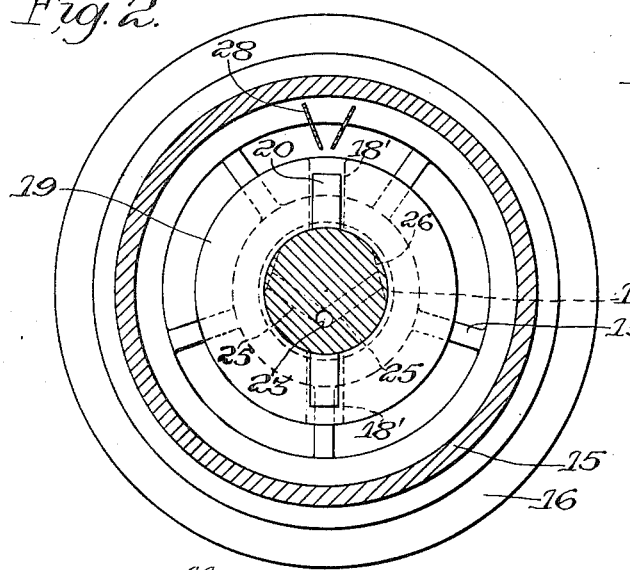
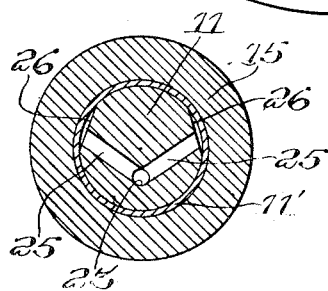
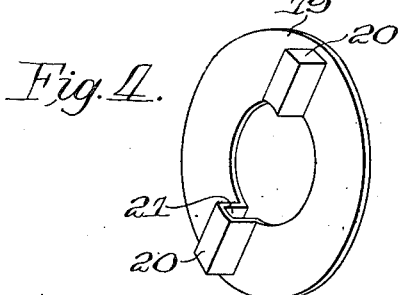
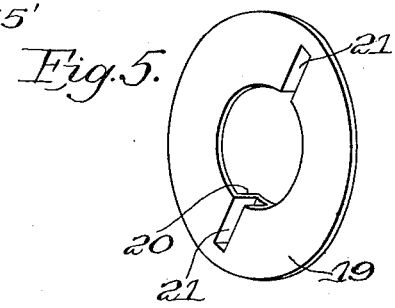
Inventors
David B. Baker
and Clifford R. Rogers
By V. F. Larraque
Atty.

Patented Nov. 14, 1939

2,179,875

UNITED STATES PATENT OFFICE 2,179,875

TRACK ROLLER

David B. Baker, Riverside, and Clifford R. Rogers, Oak Park, Ill., assignors to International Harvester Company, a corporation of New Jersey Application July 3, 1937, Serial No. 151,862

5 Claims. (Cl. 308—117)

This invention relates to an improved construction of track rollers for use in connection with the traction devices of track type tractors.

Each of these track rollers is usually mounted in side frames on a stationary shaft formed with a thrust flange intermediate its ends, and serves to transmit the load of the tractor to the ground run of the endless track belts. As these rollers are thus subjected to severe loads, it is important that they be sturdily constructed, so as to withstand these loads.

Each track roller is mounted for rotation on a pair of carrier sleeves rotatably carried on the shaft with the thrust flange disposed between the adjacent inner ends of the carrier sleeves. It is important that these rollers be designed to facilitate manufacture and assembly thereof, and that the bearing surfaces be ample to take the loads and prevent wear. It is also important that the bearing surfaces be properly lubricated both at slow and relatively high speed turning of the rollers, particularly those bearing surfaces between opposite faces of the thrust flange and adjacent inner ends of the carrier sleeves.

The main object of the invention, therefore, is to provide bearing or thrust members to be disposed between opposite faces of the thrust flange and adjacent inner ends of the carrier sleeves.

An important object of the invention is to provide these bearing or thrust members with lubricant reservoirs which are adapted to distribute lubricant over the faces of the thrust flange.

Another object of the invention is generally to provide an improved track roller construction for the purposes stated.

Briefly, these and other objects may be achieved by the practicable form of the invention herein illustrated and described, and in which form the side track frame of a crawler tractor carries brackets for mounting a stationary shaft, which between its ends is upset to form an intermediate thrust flange. A pair of carrier sleeves are rotatably carried by the stationary shaft on each side of the intermediate thrust flange. A track roller is fitted over the carrier sleeves and mounted for rotation therewith between the side members of the track frame. A bearing or thrust member, having a lubricant reservoir, is positioned between the inner end of each carrier sleeve and each face of the thrust flange. Each lubricant reservoir is open to the thrust flange and to the shaft and is adapted to receive lubricant from the shaft and to distribute it over opposite faces of the thrust flange. In this manner, opposite faces of the thrust flange are properly lubricated to provide a suitable bearing surface to take endwise thrust of the roller.

A more complete understanding of the objects and the desirable features may be had from the following description and the illustrations in the accompanying sheet of drawings, in which:

Figure 1 is a vertical sectional view of a preferred form of track roller construction embodying the invention;

Figure 2 is a sectional view taken on the line 2—2 of Figure 1;

Figure 3 is a sectional view taken substantially on the line 3—3 of Figure 1; and, Figures 4 and 5 are opposite face views in perspective of one of the bearing members, showing the construction thereof.

The track type tractor side truck frame comprises spaced side channel frame members 10, cross-connected by a top plate (not shown), which is more or less conventional construction. A horizontal stationary shaft 11, being cut out at its ends to form flat upper surfaces 12, is carried transversely across the side frame members 10 and secured thereto by bearing brackets 12'. The flat surfaces 12 engage the lower edges of the side frame members 10, and rotation of the shaft 11 is thereby prevented. Intermediate its ends, the shaft is provided with an annular thrust flange 13 having opposite faces 14, which are machined to provide bearing surfaces for a purpose to be hereinafter described. A pair of carrier sleeves 15 are turnably mounted on the shaft 11 on bearing sleeves 11' between the side frame members 10, with the thrust flange 13 disposed between adjacent inner ends thereof. A track roller 16 is fitted over the carrier sleeves 15 and mounted for rotation therewith, and is provided at each end with a snap ring 17 for preventing axial displacement with respect to the carrier sleeve 15. Each carrier sleeve 15, at its inner end, is provided with an annular flange 18. A pair of bearing members 19 in the form of thrust washers surround the shaft 11, one being disposed between each flange 18 of the carrier sleeve 15 and each bearing face 14 of the thrust flange 13.

Each bearing or thrust member 19 is preferably formed of sheet metal and has provided therein and integral therewith axially extending hollow portions 20 at one side thereof. At the opposite side of the bearing members, the hollow portions 20 provide lubricant reservoirs 21. Each portion 20 is closed at its radially outermost end, and the lubricant reservoir therein is opened to the bearing face of the thrust flange and to the shafts 11. The bearing members 19 are mounted for rotation with the carrier sleeves 15 by means of radial slots 18' formed in the inner ends of the carrier sleeves. These slots 18' correspond to the axially extending, hollow portions on the bearing members 19. These opposite flat sides of each bearing member are positioned between each bearing face 14 and the face of each flange 18 on each carrier sleeve 15.

The shaft 11 is provided with an axial bore 23 substantially centrally disposed therein. A pressure lubricant fitting 24 is fitted into an enlarged end of the bore at one end of the shaft 11 for supplying lubricant thereto and to communicating lubricant passages 25 extending from the bore 23 to oppositely disposed flat surfaces 26 of the shaft 11, as shown in Figure 2. In this manner, lubricant supplied through the fitting 24 is distributed over the flat surfaces 26 and from there entirely over the shaft 11 to lubricate the bearing surfaces between the shaft and the carrier sleeves 15.

As previously mentioned, the lubricant reservoirs 21 in the bearing members 19 are open to the shaft 11 and to the bearing faces 14 of the thrust flange 13. In this manner, the reservoirs 21 are adapted to receive lubricant from the shaft 11 and to distribute it over the bearing faces 14 to lubricate the bearing surfaces between opposite sides of the thrust flange 13 and the inner faces of the bearing members 19. It will be apparent thus far that the construction provided in the preferred embodiment of the invention makes possible the proper lubrication of all bearing surfaces within the track roller assembly, especially those bearing surfaces subjected to the greatest loads, such as the bearing surfaces between the thrust flange 13 and the bearing members 19.

To augment further the lubrication of the track roller assembly, a certain amount of lubricant is retained within the track roller 16 and between the carrier sleeves 15. For the purpose of distributing this lubricant about the entire assembly, the carrier sleeves 15 are provided with radially disposed web or blade portions 15'. Lubricant in the lower portion of the track roller is carried upwardly by rotation thereof. The thrust flange 13 is provided with a radial bore 27 extending vertically in the thrust flange and communicating with the axial bore 13 in the shaft 11. A funnel or scoop member 28 is secured to a pipe or tube which is fitted into the bore 27, as best shown in Figure 1. Lubricant carried to the top of the roller assembly by the web portions 15' of the carrier sleeves 15, and by the track roller 16, is received by the funnel or scoop member 28 and passes downwardly through the bore 27 to the axial bore 23, from whence it is distributed through the bores 25 to the flat surfaces 26 on the shaft 11.

It will be seen that, as the bearing members 19 are mounted for rotation with the carrier sleeves 15, the angular positions of the lubricant reservoirs 21 are constantly changed with respect to the thrust flange 19. Because of this provision in the structure and function of the present invention, lubricant is continually supplied to the bearing surfaces 14 of the thrust flange 13, as the bearing members 19 virtually wipe these faces with a continual supply of lubricant.

Appropriate lubricant retaining seals are provided between each bracket 12' and each carrier sleeve 15, and between each bracket 12' and the shaft 11.

From the foregoing description, it will be apparent that provision has been made for properly lubricating a generally improved track roller construction. It will be understood that numerous modifications and alterations may be made in the practicable example chosen for the purposes of this disclosure without departing from the spirit and scope of the invention as indicated in the following claims.

What is claimed is:

1. In a track roller assembly including a stationary shaft formed with a thrust flange intermediate its ends, a pair of carrier sleeves turnable on the shaft with the thrust flange disposed between adjacent inner ends thereof, and a track roller fitted over said carrier sleeves and mounted for rotation therewith, the combination with the shaft, of a pair of bearing members surrounding the shaft, one disposed between the inner end of each carrier sleeve and each face of the thrust flange, each of said bearing members being formed with an axially extending hollow portion forming a pocket closed at its radially outermost end and providing a lubricant reservoir open to the thrust flange and to the shaft, said reservoirs being thereby adapted to receive lubricant from the shaft and to distribute it over opposite faces of the thrust flange.

2. In a track roller assembly including a stationary shaft formed with a thrust flange intermediate its ends, a pair of carrier sleeves turnable on the shaft with the thrust flange disposed between adjacent inner ends thereof, and a track roller fitted over said carrier sleeves and mounted for rotation therewith, the combination with the shaft, of a pair of bearing members surrounding the shaft, one disposed between the inner end of each carrier sleeve and each face of the thrust flange, each of said bearing members being formed with an integral axially extending hollow portion forming a pocket and providing a lubricant reservoir open to and adapted to distribute lubricant over a face of the thrust flange, and slots formed in the inner ends of the carrier sleeves to receive the axially extending portions on the bearing members.

3. In a track roller assembly including a stationary shaft formed with a thrust flange intermediate its ends, a pair of carrier sleeves turnable on the shaft with the thrust flange disposed between adjacent inner ends thereof, and a track roller fitted over said carrier sleeves and mounted for rotation therewith, the combination with the shaft, of a pair of thrust washers surrounding the shaft, one disposed between the inner end of each carrier sleeve and each face of the thrust flange, each of said bearing members being formed with a pair of integral axially extending hollow portions forming diametrically opposed pockets providing lubricant reservoirs open to the shaft and to the flange and adapted to distribute lubricant over a face of the thrust flange, portions of the members forming the pockets serving to engage respective carrier sleeves for rotating the members with the sleeves.

4. In a track roller assembly including a stationary shaft formed with a thrust flange intermediate its ends, a pair of carrier sleeves turnable on the shaft with the thrust flange disposed between adjacent inner ends thereof, and a track roller fitted over said carrier sleeves and mounted for rotation therewith, the combination with the shaft, of a pair of substantially circular, flat, sheet metal bearing members, each formed with a diametrically extending groove terminating radially inwardly of diametrically opposite portions of the periphery of the member and divided into a pair of lubricant reservoirs by a central opening substantially fitting the shaft between the inner end of a carrier sleeve and a face of the thrust flange, each member being positioned with a flat radial portion contacting a face of the thrust flange with the open side of the groove toward the flange and the closed side of the groove positively engaging a carrier sleeve for rotating the member and the sleeve conjointly, the lubricant reservoirs being thereby adapted to distribute lubricant over respective faces of the thrust flange.

5. In a track roller assembly including a stationary shaft formed with a thrust flange intermediate its ends, a pair of carrier sleeves turnable on the shaft with the thrust flange disposed between adjacent inner ends thereof, and a track roller fitted over said carrier sleeves and mounted for rotation therewith, said assembly being enclosed and containing lubricant and including means whereby lubricant is supplied to the surface of the shaft, the combination with the shaft of a pair of thrust washers surrounding the shaft, one disposed between the inner end of each carrier sleeve and each face of the thrust flange, each of said thrust washers being formed of sheet metal and having means radially disposed thereon to form lubricant reservoirs open to a portion of the surface of the shaft and to the thrust flange and adapted to receive lubricant from the shaft and to distribute same over opposite sides of the thrust flange, said means further providing driving portions for respectively engaging the carrier sleeves for positively driving the sleeves and washers conjointly.

DAVID B. BAKER.
CLIFFORD R. ROGERS.